United States Patent [19]
Allen

[11] 4,428,516
[45] Jan. 31, 1984

[54] COLLAPSABLE BICYCLE CARRIER

[76] Inventor: Richard A. Allen, Lewis St., Lincoln, Mass. 01773

[21] Appl. No.: 341,303

[22] Filed: Jan. 21, 1982

[51] Int. Cl.³ .............................................. B60R 9/10
[52] U.S. Cl. .............................. 224/314; 224/42.03 B; 224/309
[58] Field of Search ................. 224/42.03 R, 42.03 B, 224/314, 309, 321, 329

[56] References Cited

U.S. PATENT DOCUMENTS

| | | | |
|---|---|---|---|
| 3,710,999 | 1/1973 | Allen | 224/42.03 B |
| 3,927,811 | 12/1975 | Nussbaum | 224/314 X |
| 4,085,874 | 4/1978 | Graber | 224/42.03 B X |
| 4,182,467 | 1/1980 | Graber | 224/309 |
| 4,290,540 | 9/1981 | Allen | 224/42.03 B X |
| 4,332,337 | 6/1982 | Kosecoff | 224/42.03 B |

*Primary Examiner*—Steven M. Pollard
*Attorney, Agent, or Firm*—Herbert L. Bello

[57] ABSTRACT

A folding carrier for carrying objects on an automobile or the like has a frame to which a carrying member and a supporting member are pivotally mounted for movement between collapsed and extended positions. The carrier is designed so that the carrying member is held in its extended position for carrying objects and the supporting member is held in its extended position for mounting the carrier on the automobile. When the carrying member is moved from its collapsed position to its extended position a portion of the carrying member contacts the frame and the carrying member is braced against the frame.

12 Claims, 5 Drawing Figures

COLLAPSABLE BICYCLE CARRIER

BACKGROUND OF THE INVENTION

1. Field of Invention

The present invention relates to carriers for carrying such objects as bicycles, skis, luggage and the like and, more particularly, is directed towards foldable carriers of the foregoing type that are configured to be attached to motor vehicles.

2. Description of the Prior Art

In recent years, the popularity of bicycle riding for sport, recreation and transportation has increased. Bicycle carriers of various configurations have been designed which enable the bicycle owner to transport one or more bicycles from place to place by means of his automobile. Folding carriers of the foregoing type are shown in my U.S. Pat. Nos. 4,109,839 and 4,290,540. Such carriers have been introduced with varying degrees of success. A need has arisen for an automobile carrier which can be mounted and demounted easily and which can be collapsed into a flat configuration for easy shipment and storage.

SUMMARY OF THE INVENTION

It is an object of the present invention to provide a folding carrier which can be easily mounted to and demounted from a motor vehicle and which can be folded into a relatively flat configuration for easy shipment and storage. The carrier includes a main frame to which a carrying member and a supporting member are pivotally mounted for movement between a collapsed position and an extended position. The carrier is configured so that the carrying member and the supporting member are held in their extended positions. Straps are provided for securing the carrier to the motor vehicle. In the extended position, the frame and support members are in contact with the motor vehicle and the carrying member extends outwardly from the frame. When the carrying member is moved from the collapsed position to the extended position, it engages the frame and is braced against the frame.

Other objects of the present invention will in part be obvious and will in part appear hereinafter.

The invention accordingly comprises the apparatuses and systems, together with their parts, elements and interrelationships that are exemplified in the following disclosure, the scope of which will be indicated in the appended claims.

BRIEF DESCRIPTION OF THE DRAWINGS

A fuller understanding of the nature and objects of the present invention will become apparent upon consideration of the following detailed description taken in connection with the accompanying drawings, wherein.

DETAILED DESCRIPTION OF THE PREFERRED EMBODIMENTS

Figure 1:
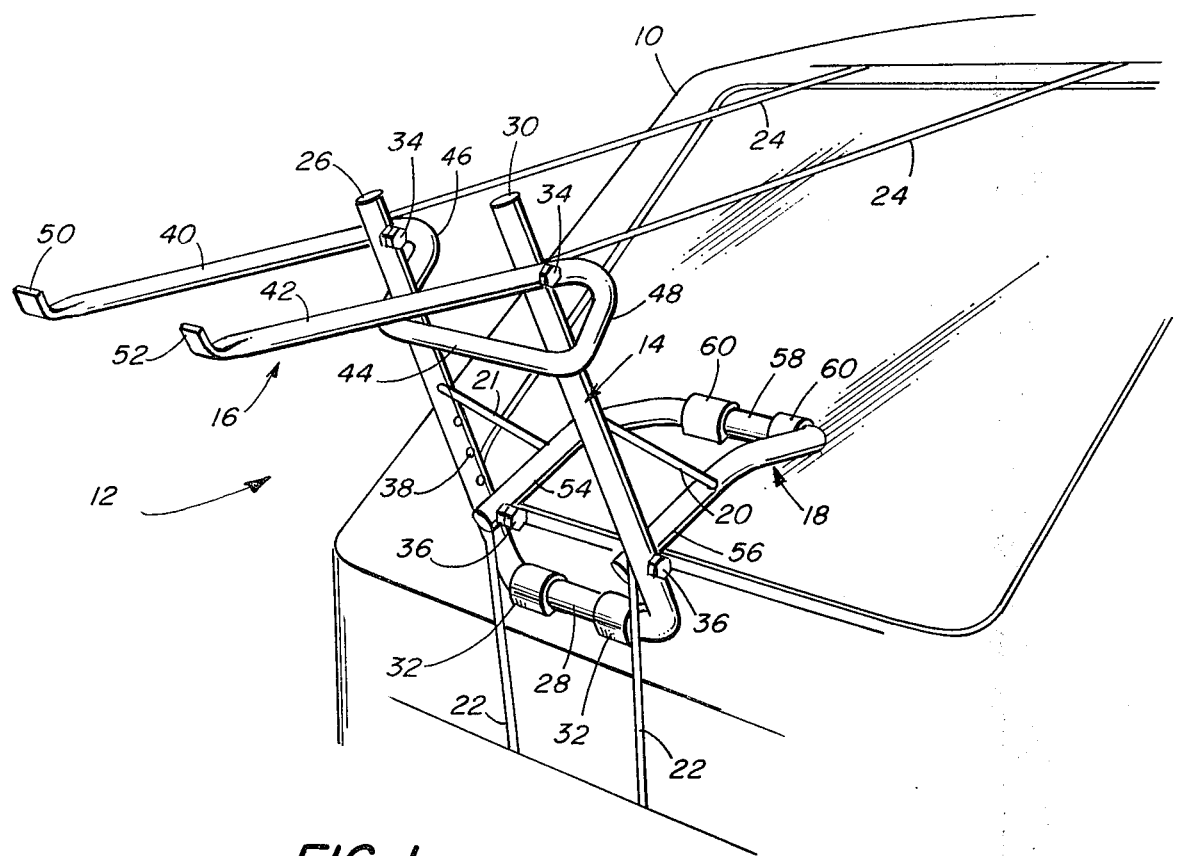
FIG. 1 is a perspective view of a foldable carrier embodying the invention in an extended position mounted on an automobile trunk.
Figure 2:
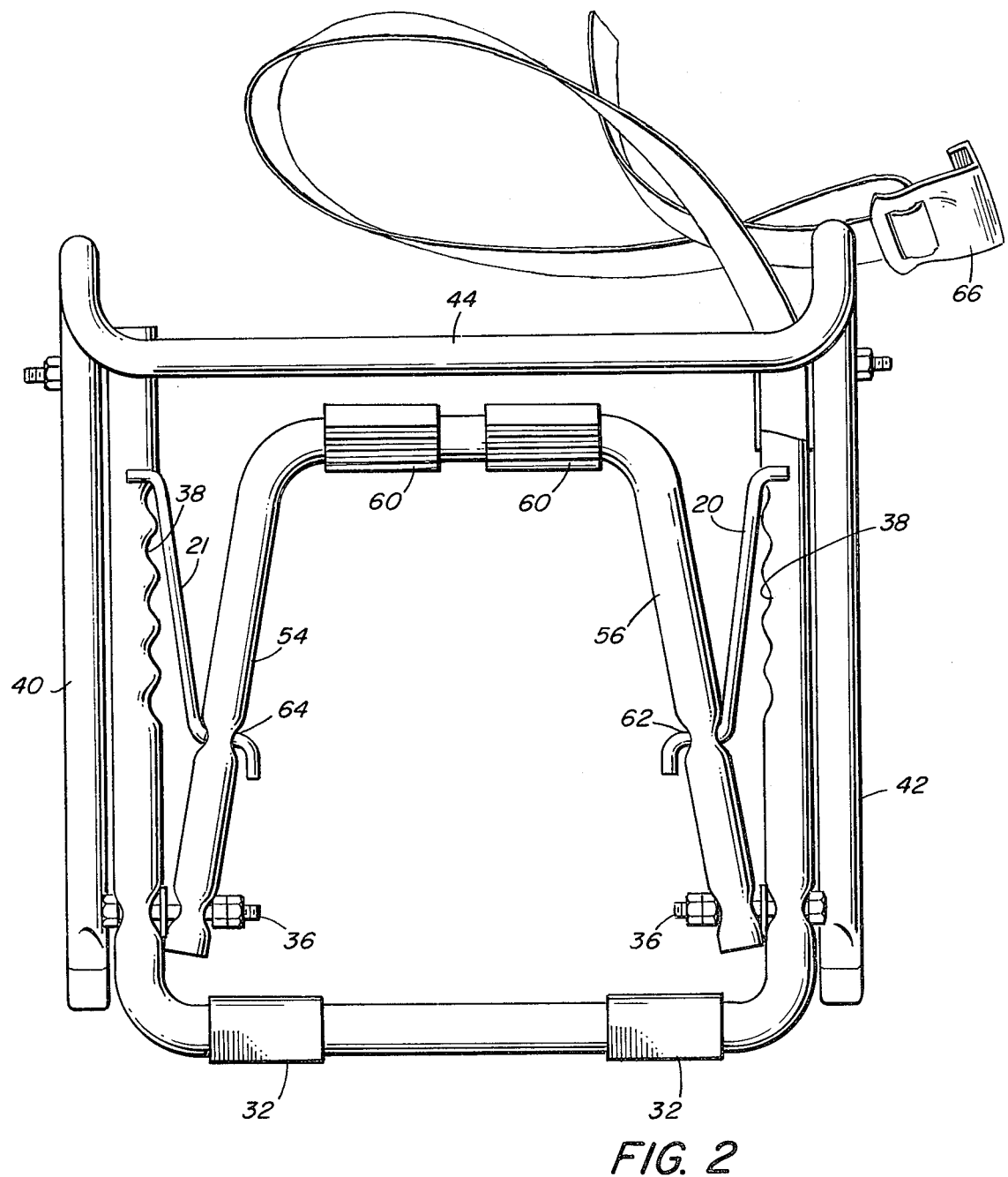
FIG. 2 is a top view of the carrier of FIG. 1 in its collapsed position.
Figure 3:
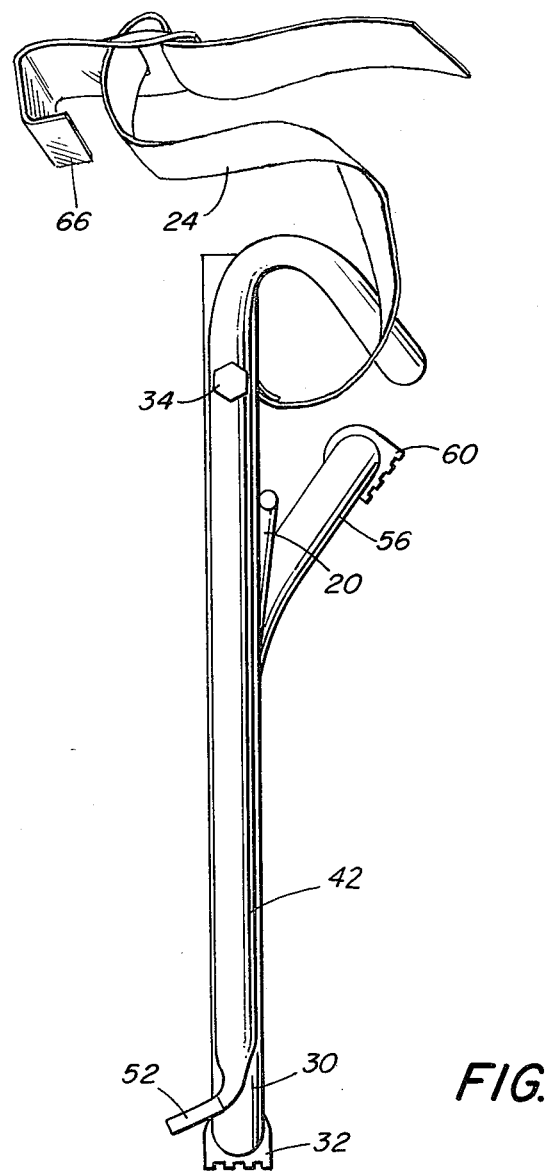
FIG. 3 is a side view of the carrier of FIG. 1 in its collapsed position.

Referring now to the drawings, particularly FIGS. 1-3, there is shown an automobile trunk lid 10 with a folding carrier 12 embodying the present invention attached thereto. As hereinafter described, folding carrier 12 is movable between an erect extended position and a flat collapsed position. The extended position is shown in FIG. 1 and the collapsed position is shown in FIGS. 2 and 3. Folding carrier 12 includes a main frame 14, a carrying member 16 and a supporting member 18. A pair of bracing members 20 and 21 are provided for holding supporting member 18 at selected angular positions with respect to main frame 14. Attaching hardware such as rearward straps 22 and forward straps 24 secure carrier 12 to the automobile.

Main frame 14, for example a hollow metal pipe, includes a first leg 26, a base 28 and a second leg 30 defining a substantially U-shaped member. A pair of protective pads or feet 32 which rest on a lid 10 are provided on base 28. Carrying member 16 is pivotally mounted to an upper portion of each leg 26 and 30 by means of pins or fasteners 34, for example screws. Supporting member 18 is pivotally mounted to a lower end of legs 26 and 30 by means of pins or fasteners 36, for example rivets or screws. A series of holes 38, which are configured to receive the ends of bracing members 20 and 21, are formed on the intermediate portion of each leg 26, 30. In an alternative embodiment, a single bracing member having arms that engage the holes 38 in each leg 26, 30 is provided rather than the split bracing member shown in the drawings.

Carrying member 16, for example a hollow metal pipe, includes a pair of arms 40, 42 and a cross member 44 which is joined to arms 40 and 42 through reversally bent members 46 and 48, respectively. The ends of arms 40 and 42 are bent upwardly to form stops 50 and 52. A suitable protective covering, such as a plastic tubing or the like, may cover all of or a portion of arms 40, 42 and stops 50 and 52.

Supporting member 18 includes legs 54, 56 which are interconnected by a base member 58. A pair of protective pads or feet 60 are provided on base 58, legs 54 and 56 being bent downwardly near base 58 so that feet 60 can rest firmly on the surface of lid 10. The ends of legs 54 and 56 are pivotally connected to frame 14 by pins or fasteners 36, for example rivets or screws. Bracing members 20 and 21 are pivotally received within holes 62 and 62 which are formed in legs 56 and 54, respectively.

In the erect extended position of carrier 12 shown in FIG. 1, protective feet 32 and 60 rest on lid 10 of the automobile. One end of each strap 24 and one end of each strap 22 is threaded about screws 34 and 32, respectively. For example, the end of each strap 24 is provided with a loop that is positioned between main frame 14 and carrying member 16, screw 34 passing through the loop. Similarly, one end of each strap 22 is formed with a loop which is held between main frame 14 and supporting member 18, screw 36 passing through the loop. The other end of each strap 22 and 24 is provided with a suitable clip 66 that is configured to engage lid 10 or the bumper of the automobile.

Folding carrier 10 is readily moved from the extended position shown in FIG. 1 to the folded or collapsed position shown in FIGS. 2 and 3 by merely pivoting carrying member 16 and supporting member 18.

When carrier 12 is in the extended position shown in FIG. 1, carrying member 16 and supporting member 18 extend in opposite directions from opposite ends of frame 14 in substantially parallel relationship to one another and in substantially perpendicular relationship to frame 14. Although carrying member 16 is always generally perpendicular to frame 14 when in its extended position, the relative angular orientation of frame 14 and supporting member 18 depends upon the physical configuration of the object upon which carrier 12 is being mounted on. When carrier 12 is in its collapsed position, frame 14, carrying member 16 and supporting member 18 are substantially in side-by-side relationship to one another. Initially, carrying member 16 is rotated clockwise from the extended position shown in FIG. 1 to the collapsed position shown in FIGS. 2 and 3. It is to be noted that carrying member 16 is mounted to main frame 14 in such a manner that cross member 44 passes over the top of legs 26 and 30 when carrying member 16 is rotated from its extended position to its collapsed position. That is, the distance from screw 34 to cross member 44 is greater than the distance from screw 34 to the ends of frame 14. When carrying member 16 is rotated from its collapsed position to its extended position by moving the carrying member in a counterclockwise direction, cross member 44 engages legs 26 and 30, thereby preventing further rotation of the carrying member. Carrying member 16 is now braced against frame 14 and provides a rigid support for articles such as bicycles, for example, which are to be carried on carrying arms 40 and 42. Supporting member 18 is moved from its extended position shown in FIG. 1 to its collapsed position shown in FIGS. 2 and 3 first by pulling bracing members 20 and 21 out of holes 38 and then by rotating supporting member 18 counterclockwise to its collapsed position. It will be readily appreciated that the series of holes 38 in legs 26 and 30 are provided as a means for adjusting the relative position of supporting member 18 with respect to main frame 14 when folding carrier 12 is in its extended position to accomodate a variety of mounting surface configurations or automobile shapes so that carrying member 16 will be substantially horizontal when in its extended position. That is, bracing members 20 and 21 are inserted into appropriate holes 38 in legs 26 and 30 so that feet 32 and 60 rest on the mounting surface and carrying member 16 is substantially horizontal. It will be readily appreciated that carrying member 16 can be rotated out of the way when not in use even though carrier 12 is mounted on an automobile.

Figure 4:
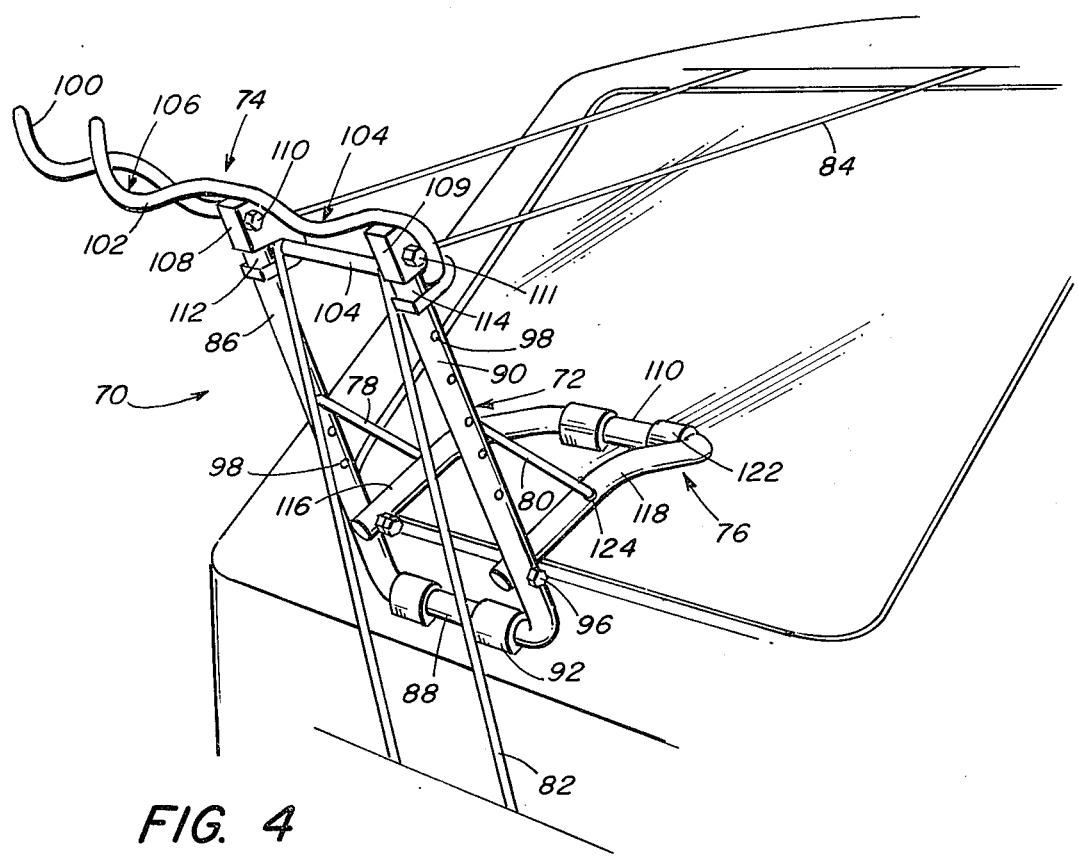
FIG. 4 is a perspective view of another embodiment of the invention.

Referring now to FIG. 4, there is shown an alternate embodiment of the invention in the form of a folding carrier 70 which is movable between an erect extended position and a flat collapsed position, the extended position being shown. Folding carrier 70 includes a main frame 72, a carrying member 74 and a supporting member 76. Main frame 72 and supporting member 74 are substantially equal in structure and function to main frame 14 and supporting member 18, respectively. Bracing members 78 and 80 are provided for holding supporting member 76 at a selected angular position with respect to main frame 72. Attaching hardware such as rearward straps 82 and forward straps 84 secure carrier 70 to the automobile.

Main frame 72, for example a hollow metal pipe bent into a substantially U-shaped configuration, includes a first leg 86, a base 88 and a second leg 90. Base 88 is provided with a pair of protective pads or feet 92 which rest on lid 10. Carrying member 74 is pivotally mounted to an upper portion of legs 86 and 90 and supporting member 78 is pivotally mounted to a lower end of legs 86 and 90 by means of pins or fasteners 96. A series of holes 98 formed at intermediate portions of legs 86 and 90 are configured to receive the ends of bracing members 78 and 80.

Carrying member 74, for example a hollow metal pipe, includes a pair of arms 100, 102 and a cross member 104. Each arm 100 and 102 is formed with double bent portions 104 and 106 so that when two bicycles are supported on carrying member 74, they remain separated. A suitable protective covering such as a plastic tubing or the like may cover all of or a portion of arms 100 and 102. Carrying member 74 is pivotally mounted to frame 72 by a pair of brackets 108 and 109 that are secured to legs 86 and 90, respectively, by fasteners 110 having enlarged heads 111. Brackets 108 and 109 have substantially U-shaped cutouts 112 and 114 which fit over arms 86, 90 and are configured to freely receive cross arm 104. When carrying member 74 is rotated to its extended position, arms 100 and 102 contact enlarged heads 111 and further rotation of carrying member 74 is prevented. The bracing of carrying member 74 against enlarged heads 111 provides a rigid support for the bicycles or other articles which are to be carried on carrying member 74.

Supporting member 76 includes legs 116, 118 which are interconnected by a base member 120. A pair of protective pads or feet 122 are provided on base 120, leg 116 and 118 being bent downwardly near base 120 so that feet 122 can rest firmly on lid 10. The ends of legs 116 and 118 are pivotally connected to frame 72 by pins 96. Bracing members 78 and 80 are pivotally received within holes 124 which are formed in legs 116 and 118, respectively.

In the erected extended position of carrier 70 shown in FIG. 4, protective feet 92 and 122 rest on lid 10 of the automobile, straps 82 and 84 being attached to the carrier and automobile in the manner previously described in connection with FIG. 1. Folding carrier 70 is readily moved from the extended position shown in FIG. 4 to the folded or collapsed position by merely pivoting carrying member 74 and supporting member 76. Carrying member 74 is rotated clockwise from its extended position to its collapsed position at which arms 100 and 102 are beside legs 86 and 90. Carrying arm 74 is rotated from its collapsed position to its extended position by moving the carrying arm in a counterclockwise direction, so that arm 100 and 102 engage heads 111, thereby preventing further rotation of the carrying member and providing a rigid support for articles which are to be carried on the carrying member. Supporting member 76 is moved to its collapsed position in the same manner as described in connection with supporting member 18.

Figure 5:
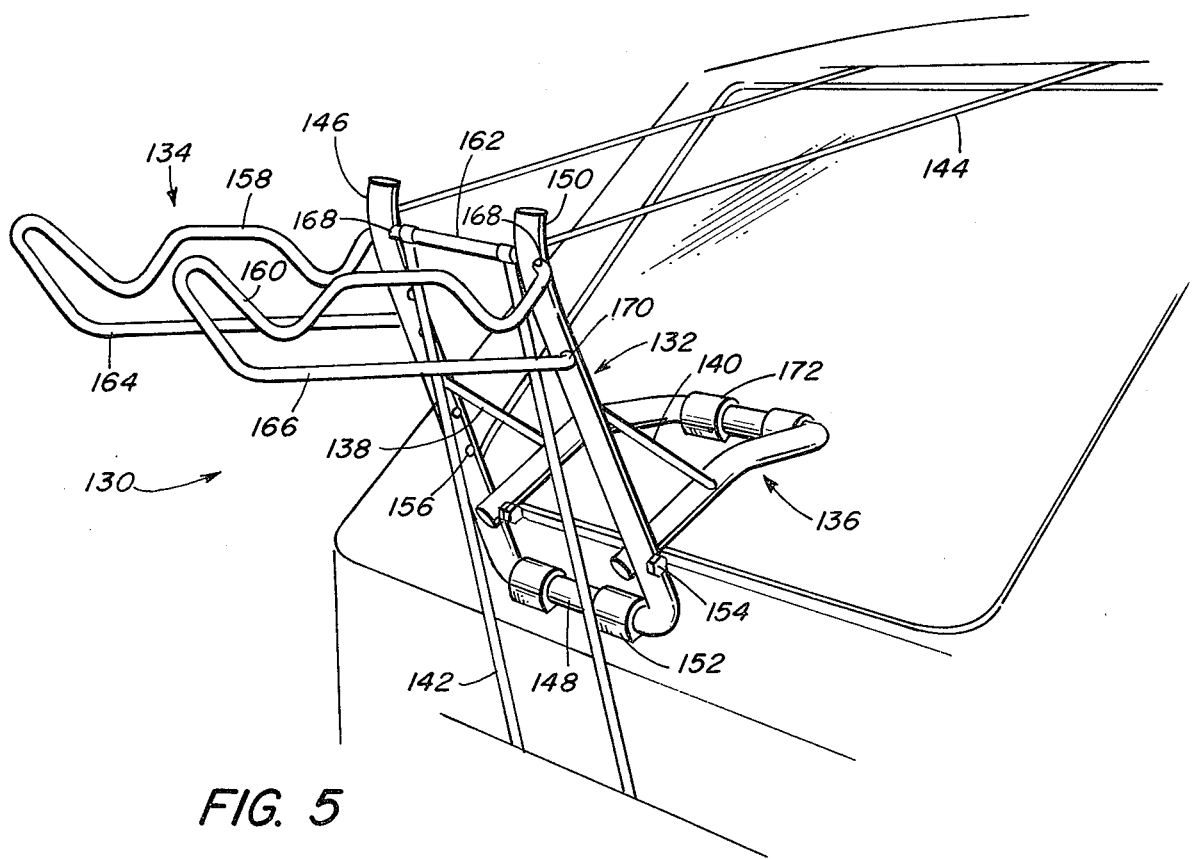
FIG. 5 is a perspective view of a further embodiment of the invention.

Referring now to FIG. 5, there is shown a folding carrier 130 which is a further embodiment of the invention. Folding carrier 130 is movable between an erect extended position and a flat collapsed position. The extended position being shown in FIG. 5. Folding carrier 130 includes a frame 132, a carrying member 134 and a supporting member 136. A pair of bracing members 138 and 140 are provided for holding supporting member 136 at a selected angular position with respect to frame 132. Attaching hardware such as rearward straps 142 and forward straps 144 secure carrier 130 to the automobile.

Frame 132, for example a hollow metal pipe, includes a first leg 146, a base 148 and a second leg 150 which define a substantially U-shaped member. A pair of protective pads or feet 152 which rest on lid 10 are provided on base 148. Carrying member 130 is mounted to an upper portion of legs 146 and 150 and supporting member 136 is pivotally mounted to a lower end of legs 146 and 150 by means of pins or fasteners 154, for example screws. A series of holes 156, which are configured to receive the ends of bracing members 138 and 140, are formed on the intermediate portion of each leg 146 and 150.

Carrying member 134, for example a metal rod, includes a pair of upper arms 158, 160 that are joined by a cross arm 162 and a pair of lower arms 164 and 166. Cross arm 162 is freely received in holes 168 formed in legs 146, 150 and the ends of lower arms 164, 166 are received in holes 170 formed in legs 146, 150 below holes 168. When the ends of lower arms 164 and 166 are received in holes 170, carrying member 134 is locked in the extended position. When the ends of lower arms 164 and 166 are removed from holes 170, carrying member can pivot in holes 168 and move to its collapsed position. In the embodiment of FIG. 5, upper arms 158 and 160 have substantially the same two bicycle carrying capacity as carrier 70 shown in FIG. 4. A suitable protective covering such as a plastic tubing or the like may cover all of or a portion of upper arms 158 and 160. It will be readily appreciated that supporting member 136 is moved between its extended and collapsed position as hereinbefore described in connection with FIGS. 1 and 4 and that protective feet 172 are also provided on the supporting member.

Since certain changes may be made in the foregoing disclosure without departing from the scope of the invention herein involved, it is intended that all matter contained in the above description and depicted in the accompanying drawings be construed in an illustrative and not in a limiting sense.

What is claimed is:

1. A folding carrier mountable on an automobile or the like, said carrier comprising:
   (a) frame means;
   (b) a carrying member pivotally mounted to said frame means at a first end portion thereof, said carrying member constrained for limited rotational movement by said frame means between an extended position and a collapsed position, said carrying member and said frame means are substantially in side-by-side relationship when said carrying member is in its collapsed position; and
   (c) a supporting member pivotally mounted to said frame means at a second end portion thereof, said supporting member movable between an extended position and a collapsed position, said supporting member and said frame means are substantially in side-by-side relationship when said supporting member is in its collapsed position, said first end portion and said second end portion at opposite end portions of said frame means.

2. The folding carrier as claimed in claim 1 including bracing means for selectively positioning said supporting member and said frame means in fixed relationship at selected angular positions with respect to one another.

3. The folding carrier as claimed in claim 1 wherein said frame means includes a first leg, a second leg and a base, said carrying member pivotally mounted to an upper portion of said first and second legs, said supporting member pivotally mounted to a lower portion of said first and second legs.

4. The folding carrier as claimed in claim 3 including bracket means affixed to an end of each said leg, said carrying member pivotally mounted to said bracket means, said bracket means having stop means, said carrying member in contact with stop means when in said extended position.

5. The folding carrier as claimed in claim 1 wherein said carrying member includes a pair of arms and a cross member, said arms lying in a first plane, said cross member lying in a second plane, said first plane in spaced parallel relationship with said second plane, one of each said arms pivotally mounted to said frame means at a first distance from the end of said frame means, said cross member at a second distance from said end of said frame means when said carrying member is in said extended position, said first distance less than said second distance.

6. The folding carrier as claimed in claim 1 wherein said carrying member includes a pair of upper arms, a pair of lower arms and a cross member, at least one of said pairs of arms and said frame means in fixed engagement when said carrying member is in said extended position.

7. A folding carrier mountable on an automobile or the like, said carrier comprising:
   (a) frame means;
   (b) a carrying member pivotally mounted to said frame means at a first end portion thereof, said carrying member constrained against full rotational movement by said frame means, said carrying member rotatable between an extended position and a collapsed position, said carrying member rotated in a first direction from said extended position to said collapsed position and in a second direction from said collapsed position to said extended position, said first direction opposite said second direction, said carrying member and said frame are substantially in side-by-side relationship when said carrying member is in its collapsed position;
   (c) a supporting member pivotally mounted to said frame at a second end portion thereof, said first and second end portions at opposite end portions of said frame means, said supporting member movable between an extended position and a collapsed position, said supporting member and said frame means are substantially in side-by-side relationship when said supporting member is in its collapsed position; and
   (d) bracing means for selectively positioning said supporting member and said frame means in fixed relationship at selected angular positions with respect to one another.

8. The folding carrier as claimed in claim 7 wherein said frame means includes a first leg, a second leg and a base, said frame means having a substantially U-shaped profile.

9. The folding carrier as claimed in claim 8 including bracket means affixed to an end of each said leg, said carrying member pivotally mounted to said bracket means, said bracket means having stop means, said carrying member in contact with stop means when in said extended position.

10. A folding carrier mountable on an automobile or the like, said carrier comprising:

(a) frame means;
(b) a carrying member pivotally mounted to said frame means, said carrying member constrained against full rotational movement by said frame means, said carrying member rotatable between an extended position and a collapsed position, said carrying member rotated in a first direction from said extended position to said collapsed position and in a second direction from said collapsed position to said extended position, said first direction opposite said second direction, said carrying member and said frame means substantially in perpendicular relationship to one another when said carrying member is in its extended position, said carrying member and said frame means are substantially in side-by-side relationship when said carrying member is in its collapsed position;
(c) a supporting member pivotally mounted to said frame means, said supporting member movable between an extended position and a collapsed position, said supporting member and said frame means are substantially in side-by-side relationship when said supporting member is in its collapsed position; and
(d) bracing means for selectively positioning said supporting member and said frame means in fixed relationship at selected angular positions with respect to one another;
(e) said frame means including a first leg, a second leg and a base, said frame means having a substantially U-shaped profile;
(f) said carrying member including a pair of arms and a cross member, said arms lying in a first plane, said cross member lying in a second plane, said first plane in spaced parallel relationship with said second plane, one of each said arms pivotally mounted to one of each said legs of said frame means at a first distance from the ends of said legs, said cross member disposed at a second distance from said ends of said legs when said carrying member is in said extended position, said first distance less than said second distance.

11. A folding carrier mountable on an automobile or the like, said carrier comprising:

(a) frame means;
(b) a carrying member pivotally mounted to said frame means and constrained for limited rotational movement by said frame means between an extended position and a collapsed position, said carrying member and said frame means substantially in perpendicular relationship to one another when said carrying member is in its extended position, said carrying member and said frame means are substantially in side-by-side relationship when said carrying member is in its collapsed position; and
(c) a supporting member pivotally mounted to said frame means, said supporting member movable between an extended position and a collapsed position, said supporting member and said frame means are substantially in side-by-side relationship when said supporting member is in its collapsed position;
(d) said frame means including a first leg, a second leg and a base, said carrying member and supporting member pivotally mounted to said first and second legs;
(e) said carrying member including a pair of arms and a cross member, said arms lying in a first plane, said cross member lying in a second plane, said first plane in spaced parallel relationship with said second plane, one of each said arms pivotally mounted to one of each said legs of said frame means at a first distance from the ends of said legs, said cross member at a second distance from said ends of said legs when said carrying member is in said extended position, said first distance less than said second distance.

12. The folding carrier as claimed in claim 7 wherein said carrying member includes a pair of arms and a cross member, said arms lying in a first plane, said cross member lying in a second plane, said first plane in spaced parallel relationship with said second plane, one of each said arms pivotally mounted to said frame means at a first distance from the end of said frame means, said cross member disposed at a second distance from said end of said frame means when said carrying member is in said extended position, said first distance less than said second distance.

* * * * *